United States Patent
Saunders et al.

[11] Patent Number: 5,252,950
[45] Date of Patent: Oct. 12, 1993

[54] DISPLAY WITH RANGEFINDER

[75] Inventors: Steven E. Saunders, Cupertino; Harry Vertelney, San Carlos, both of Calif.

[73] Assignee: Apple Computer, Inc., Cupertino, Calif.

[21] Appl. No.: 811,082

[22] Filed: Dec. 20, 1991

[51] Int. Cl.5 .............................................. G09G 1/28
[52] U.S. Cl. ......................................... 345/9; 358/88; 345/139
[58] Field of Search ............... 340/700, 747, 703, 734, 340/729, 705; 359/14; 358/88–92

[56] References Cited

U.S. PATENT DOCUMENTS 4,897,715  1/1990  Beamen .......................... 340/705 X
5,124,821  6/1992  Antier et al. .................... 340/705 X

OTHER PUBLICATIONS

Wright, Jeff, "Altered States" picture dated 1989.
Foley, James D., et al., *Computer Graphics Principles and Practice*, Second Edition, 1990, Chapter 6, pp. 229–283.

*Primary Examiner*—Ulysses Weldon
*Attorney, Agent, or Firm*—Blakely, Sokoloff, Taylor & Zafman

[57] ABSTRACT

An apparatus for displaying images comprising a display capable of displaying rendered imagery. The apparatus comprises a rangefinder coupled to the display which is capable of determining the distance from a viewer to the display. The apparatus further comprises a means for displaying an image upon the display, the image having a perspective such that the display is a projection plane of a perspective volume. A distance from the projection plane to a center of the projection is proportional to the distance from the display to the viewer, and the distance from the center of the projection to the projection plane is dynamically modifiable depending on the distance detected by the rangefinder. The display may be transparent so that a background scene may be visible with the rendered image superimposed upon it.

15 Claims, 5 Drawing Sheets

DISPLAY WITH RANGEFINDER

BACKGROUND OF THE INVENTION

1. Field of the Invention

The present invention relates to computer graphics. More specifically, the present invention relates to displaying images on a display or viewfinder, and determining the distance to a viewer of the display in order to correctly render the perspective of an image on a projection plane.

2. Background Information

Viewing images in three dimensions typically requires that a "view volume" be specified in order to determine the appropriate rendering of images on a display screen. Much literature has been devoted towards the rendering of three-dimensional imagery, and especially with regards to the various perspectives and projections of images on a projection plane (see Foley, J., Van Dam, A., Feiner, S. K., and Hughes, John F., *Computer Graphics, Principles and Practice* (Second Edition, 1990) hereinafter "Foley and Van Dam," at pages 229-283). In order to accomplish projections from an image in three-dimensional space onto the projection plane, typically, using a perspective projection, the distance or hypothetical distance between the projection plane and the center of projection should be specified. This provides for a realistic representation of the perspective of the image on the projection plane or display as if the viewer was observing the real object which has been rendered. Typically, for applications wherein a user is seated at a workstation or similar environment, the distance from the projection plane to the center of projection is user definable for various effects. Distortion in perspective or scale with reference to the background is not a concern. In addition, this image need not be precisely correct, because the rendering of the image of this display may be viewed at various sizes and angles.

In at least one application, the variation of the distance between the center of projection for a 3-D image, and the projection plane may be important. For instance, in architecture, a 3-D perspective image of a building to be constructed may be rendered. In some instances, the architect may use three-dimensional models of the building to perform an evaluation of whether the building design must be modified in some manner prior to construction. This may include, among other things, a topographic construction of the environment (surrounding terrain and buildings) into which the new building is to be constructed. Again, this will provide an effective means for evaluating whether the building's design, or the surrounding landscaping must be modified in some manner prior to construction. Unfortunately, such models are typically expensive to create and are not cost effective for standard single-family homes.

Another way in which to evaluate the possible design of a building is to do a three-dimensional rendering of the image with its surrounding terrain and/or buildings. Again, as with the example of constructing models or other three-dimensional topographic views of the area, such computer-generated imagery may not be cost effective for a standard single-family construction. In addition, the rendering of the image may not be an accurate representation of the building to be constructed, and the environment into which it is to be built. This may be due to the fact that the screen is not of sufficient size to accurately render the image to cover the viewer's field of view, and the distance from the view projection plane to the center of the projection for the building may not be accurately known.

SUMMARY AND OBJECTS OF THE INVENTION

One of the objects of the present invention is to provide a means for determining the distance between the center of projection and the projection plane for accurately rendering images in 3-D perspective for viewing with a reasonably realistic perspective.

Another of the objects of the present invention is to provide a means for accurately displaying an object in the environment into which it is to be placed.

Another of the objects of the present invention is to provide a means for automatically determining the distance between a projection plane and a viewer of the projection plane in order to provide an accurate perspective of the object to be rendered.

These and other objects of the present invention are provided for by an apparatus for displaying images comprising a display capable of displaying rendered imagery and which is substantially transparent to a viewer of the display. The apparatus comprises a rangefinder coupled to the display which is capable of determining the distance from a viewer to the display. The apparatus further comprises a means for displaying an image upon the display, the image having a perspective such that the display is a projection plane of a perspective volume. A distance from the projection plane to a center of the projection is proportional to the distance from the display to the viewer, and the distance from the center of the projection to the projection plane is dynamically modifiable depending on the distance detected by the rangefinder. In preferred embodiments of the apparatus the rangefinder comprises a sonar or infrared rangefinding means. In one embodiment, the apparatus may be held in the field of view of a viewer of the display so that the background will be visible to the viewer and the image rendered on the display appears to be part of the background. The dynamically modifiable distance from the center of the projection to the projection plane is measurable by the rangefinder and, therefore, the image may be rendered with the correct perspective in relation to the background scene. In another embodiment, instead of a transparent display, the background scene may be displayed on a video display, either by digitizing the scene or by displaying a real-time video image of the scene. The rendered image may then be superimposed upon the scene using video synchronizing or similar means.

BRIEF DESCRIPTION OF DRAWINGS

The present invention is illustrated by way of example and not limitation of the figures of the accompanying in which like references indicate like elements and in which.

DETAILED DESCRIPTION

An apparatus for determining the distance to a viewer from a display and a means for rendering an object on the display with the correct perspective provided by the distance is described. In the following description, for the purposes of explanation, numerous specific details are set forth such as positions, applications, hardware devices, etc., in order to provide a thorough understanding of the present invention. It would be obvious, however, to one skilled in the art that the invention may be practiced without some of these specific details. In other instances, well-known devices and methods have not been shown in detail in order to not unnecessarily obscure the present invention.

Figure 1:
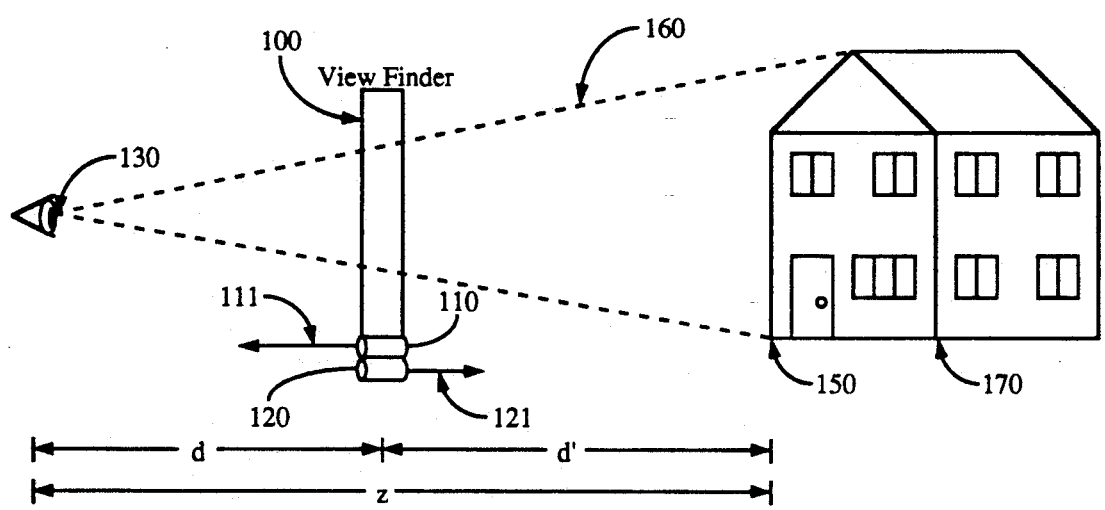
FIG. 1 shows one embodiment of the viewer rangefinder of the present invention.

The preferred embodiment of the present invention is shown as 100 in FIG. 1. 100 is a viewfinder which may be situated at a given position d from the viewer eye position 130 of the viewfinder 100. Viewfinder 100 may be a liquid crystal display (LCD), a cathode ray tube display (CRT), or other similar display well-known to those skilled in the art. In the preferred embodiment, however, 100 is a transparent liquid crystal display which is used for superimposing computer-generated imagery on the viewer's perspective of real world images when the viewer's eye position is at 130. In this manner, because view finder 100 is transparent, the images generated upon viewfinder 100 may appear to be part of the scene perceived by the viewer. Viewfinder 100 is coupled to range finding means 110 which allows the distance d between the viewer eye position 130 and the position of viewfinder 100. 110 may be a sonar, ultrasonic, infrared, or other range determining device which is well-known to those skilled in the art and commercially available. In an alternative embodiment, rangefinder 110 may comprise a camera and logic so that high frequency components in a signal obtained by aiming the camera at the viewer position are maximized. This ensures that the image is in focus and, in this way, the distance d may be computed. The position d between the viewer position 130 and the viewfinder 100 may thus be determined and the image displayed on the viewfinder may be updated in a rendering engine to which viewfinder 100 is coupled. This may allow real time updates of imagery displayed upon viewfinder 100. In this manner, if viewfinder 100's position is moved, such that d varies, then the perspective of the imagery displayed upon viewfinder 100 may be updated as often as necessary by the rendering engine.

In another alternative embodiment, viewfinder 100 further comprises a second rangefinder 120 which is used for determining the distance d' between the position of viewfinder 100 and the position 150 of an object 170 in three-dimensional space. The distances d and d' may be used to render images with the proper three-dimensional clipping volume 160 in three-dimensional space. In one embodiment, the object 170 may not be actually present, however, it may be an object which is rendered on viewfinder 100 and superimposed on a background. Its position may thus be accurately reflected as the distance d' from viewfinder 100. Therefore, the perspective to the viewer as represented on viewfinder 100 may be accurate as if object 170 actually resided at position 150 in viewing volume 160. In one application, where object 170 is physically present and able to be perceived through a transparent viewfinder 100, additions or other objects may be superimposed onto an image displayed on viewfinder 100. Thus, these additions may be shown in their proper perspective in relation to the image of object 170 on viewfinder 100. Therefore, the viewer residing at position 130 may have a proper perspective view of the imagery displayed on viewfinder 100, in relation to the viewer's perception of the real object 170 which resides at position 150.

Figure 2:
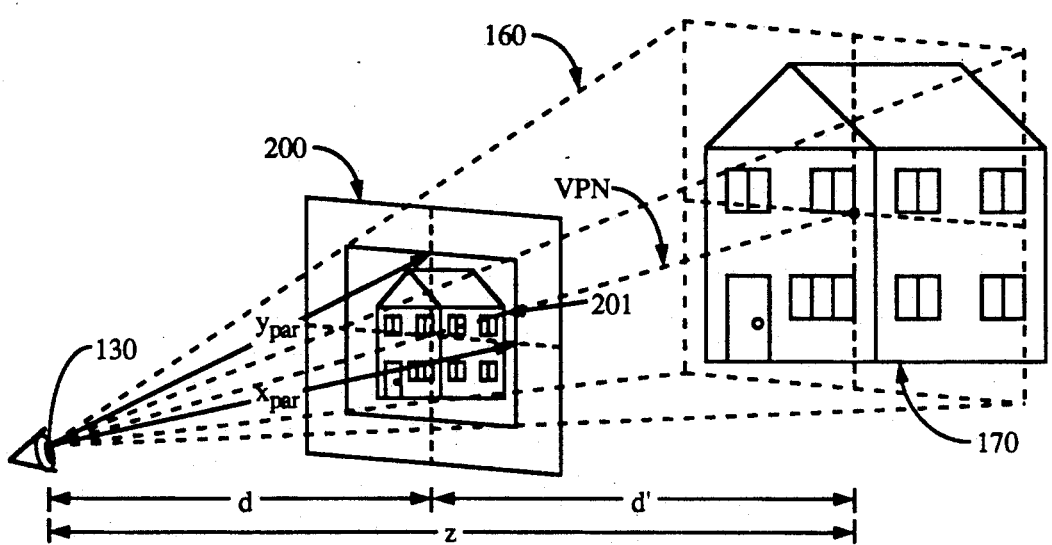
FIG. 2 shows how an image may be projected on the viewing rangefinder of the present invention using a viewing volume.

The generation of a perspective view of an object image to be displayed upon viewfinder 100 in the preferred embodiment is shown in FIG. 2. A view volume 160 as was shown in FIG. 1 may be used for generation of perspective images on a viewfinder such as 100. View volume 160 has a center of projection 130 which corresponds with the eye position of a viewer of viewfinder 100. The center of projection 130 is at a distance d with respect to the projection plane 200 shown in FIG. 2. The distance d is the same distance as that from the viewing position 130 (center of projection) to the viewfinder 100 shown in FIG. 1. To create the image 201 on the projection plane 200 of an object such as 170 to be displayed, the three orthographic projections must be used from the object in order to generate the perspective image 201 on projection plane 200. This process is described in detail in Foley and Van Dam at pages 232–237. Note that in the example shown in FIG. 2, and for the remainder of this disclosure, that the view point normal (VPN) is perpendicular to the projection plane 200. It can be appreciated by one skilled in the art, however, that an oblique perspective projection may be used and the image 201 may be modified accordingly. However, for the purposes of simplicity in the description of the preferred embodiment, VPN will be treated as perpendicular to the view plane such as 200 shown in FIG. 2 for the remainder of this application.

In the example shown in FIG. 2, the image has to be scaled based upon the d and the distances $x_{par}$ and $y_{par}$. $x_{par}$ and $y_{par}$ are the distances from the center of projection to the edge of the x and y axis on projection plane 200. Therefore, each of the x values will be scaled by a value of $x_{par}/d$, and each of the y values for the image will be scaled by the value $y_{par}/d$. Using a rendering engine which may be coupled to a viewfinder 100 such as shown in FIG. 1, different perspectives of the object 170 may be rendered upon a view plane such as 200, and thus to a display device even when varying the value d from the center of projection 130 to the projection plane 200. A detailed description of the scaling performed by an apparatus using different values of d is described in Foley and Van Dam at pages 253–260.

Figure 3:
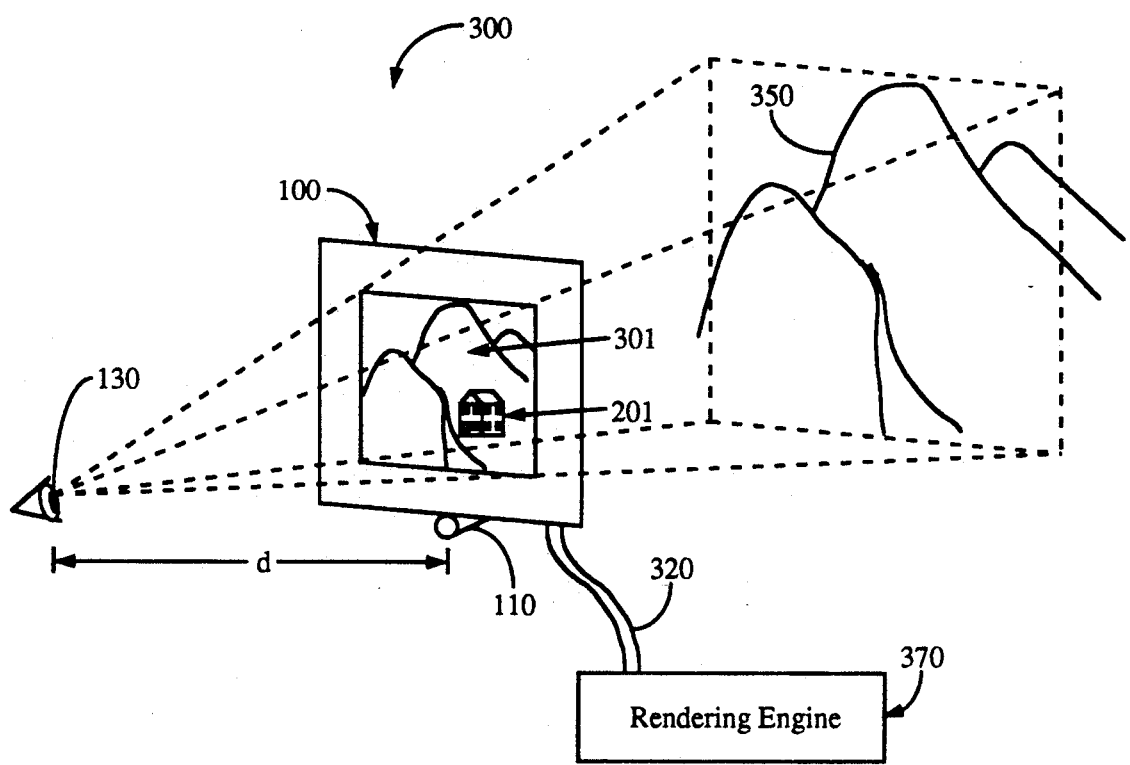
FIG. 3 shows how a transparent viewfinder used in conjunction with a rangefinder may be used for evaluating a building situated in its planned construction site.

In one embodiment, viewfinder 100 may be used in an application such as that shown in FIG. 3. For instance, the user may use the transparent viewfinder 100 in order to render an image 201 of an object superimposed upon the viewfinder view 301 of background scenery such as 350 shown in FIG. 3. For instance, 350 may be a site of a proposed building which is to be constructed. Using rangefinder device 110 to compute the distance d from viewfinder 100 to the center of projection 130 (eye position of the viewer) the appropriate calculation use d and the $x_{par}$ and $y_{par}$ values for scaling the image. Rendering engine 370 performs all the scaling and rendering operations required by the preferred embodiment. In various embodiments, rendering engine 370 may be one of any number of computers or workstations commercially available, such as the Iris workstation available from Silicon Graphics, Inc. of Mountain View, Calif., any one of the 80×86 microprocessor based IBM compatible computer systems, or any of the other microcomputers or workstations commercially available. In a preferred embodiment, however, rendering engine 370 is one of the family of Macintosh II personal computers manufactured by Apple Computer, Inc. of Cupertino, Calif. Rendering engine 370, in a preferred embodiment, comprises a 68030 central processing unit for performing the appropriate rendering of an image such as 201 on viewfinder 100. In another embodiment, the computer system shown in U.S. Pat. No. 4,622,545 may be used, which is assigned to the assignee of the present invention.

Rangefinder 110, during operation, ascertains the distance d from the viewfinder 100 to the viewing position 130 shown in FIG. 3. In this manner, feedback is provided to rendering engine 370 which may, in turn, update the image 201 on viewfinder 100. In this manner, by ascertaining the distance from viewfinder 100 to the center of projection 130, the image 201 can be scaled and rendered into its appropriate perspective on viewfinder 100 to correspond with the view field 301 of the background scenery 350 as seen by the observer through viewfinder 100. Samples may be taken by rangefinder 110 at appropriate intervals to provide smooth updates by rendering engine 370. This process is described with reference to FIG. 5.

Figure 5:
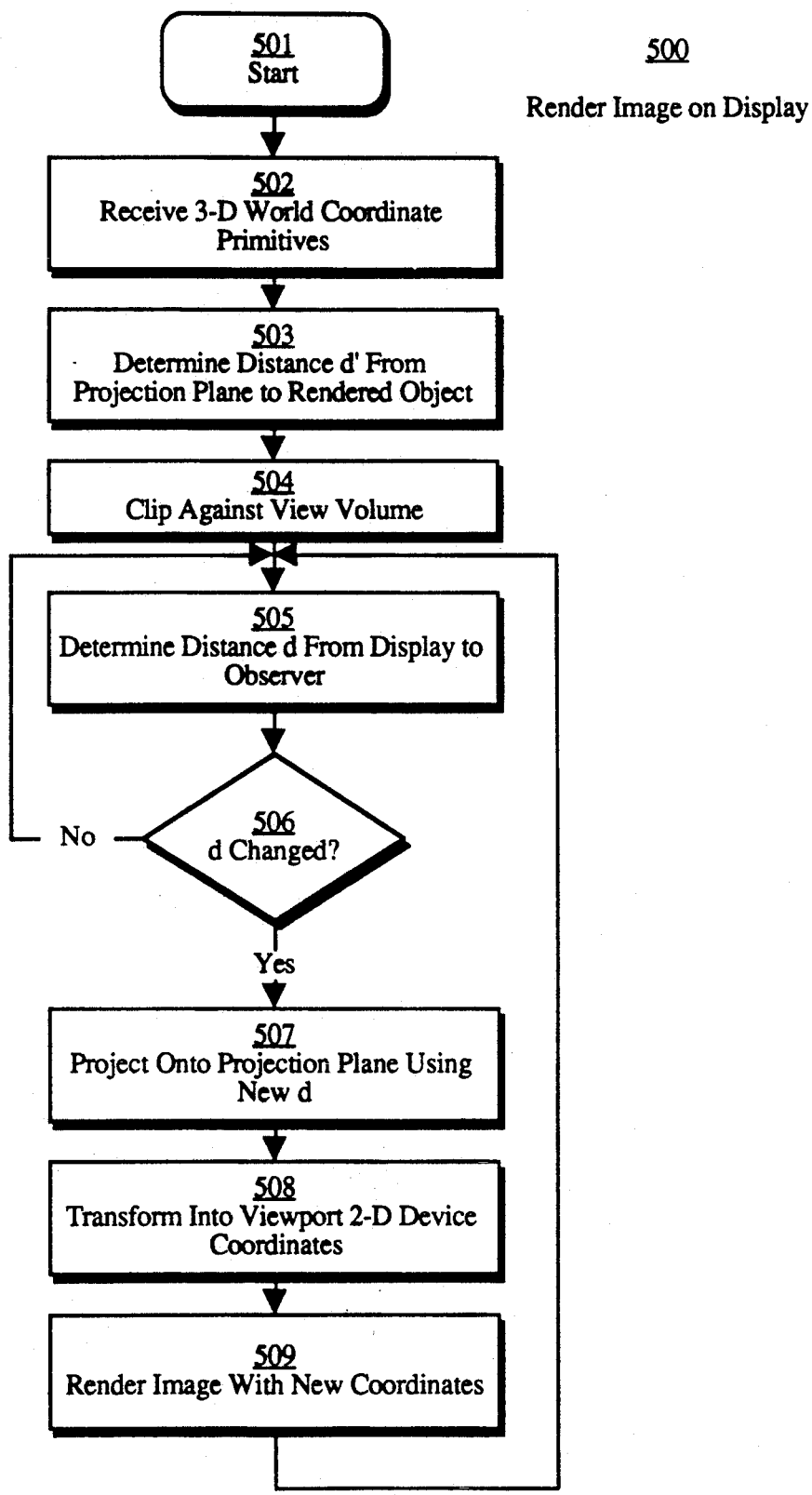
FIG. 5 shows a flowchart of a process used for rendering an image on a display which has a variable distance d to a viewer of the display.

Process 500 in FIG. 5 shows one method which may be used with apparatus 100 of the preferred embodiment to render images or objects superimposed upon background images. Process 500 starts at 501 and receives the 3-D world coordinate primitives for the object at step 502. For instance, the "dimensions" of the object in 3-D coordinate space must be ascertained. Once this has been done, the distance d' from the projection plane to the rendered object in 3-D world coordinate space is determined at step 503, as is shown in FIG. 2. Once d' has been determined at step 503, the view volume is clipped at step 504. The front clipping plane may be treated as at the viewing position 130 shown in FIGS. 1 and 3.

At step 505, the distance d from the center of the projection 130 to position of viewfinder 100 is ascertained by receiving a signal from rangefinder 110. Then, at step 506, it is determined whether d has been modified. This allows dynamic modification of the viewing distance, and thus the dynamic updating of image 201 on viewfinder 100. If d has not changed, then process 500 returns to step 505 leaving the currently rendered image on viewfinder 100 unchanged. The distance d is sampled on each iteration of step 505 and no new image is rendered unless d has changed. If d has been modified as determined at step 506, process 500 proceeds to step 507 which projects the image onto the projection plane. This is graphically represented with reference to FIG. 2 wherein an object to be rendered 170 is projected onto a projection plane such as 200 shown in FIG. 2. Once projected, at step 507, the image is transformed into the device coordinates at step 508 (for appropriate scaling in the x and y directions to show the appropriate field of view), and the image is rendered at step 509. Rendering engine 370, communicates with viewfinder 100 using a communications cable such as 320 shown in FIG. 3 for communication of pixel intensity, color, and position information. Therefore, when the value of d has changed as determined at step 506, the updated perspective of image 201 is redisplayed onto viewfinder 100. Therefore, the appropriate perspective from the viewing position 130 is maintained for all distances d between the center of projection and the position of viewfinder 100.

It can be appreciated by one skilled in the art that the use of transparent liquid crystal display such as 100 for a viewfinder may not be necessary for practicing the present invention. In fact, many alternative embodiments are contemplated within the spirit and scope of the invention. Once such alternative embodiment is shown in FIG. 4.

Figure 4:
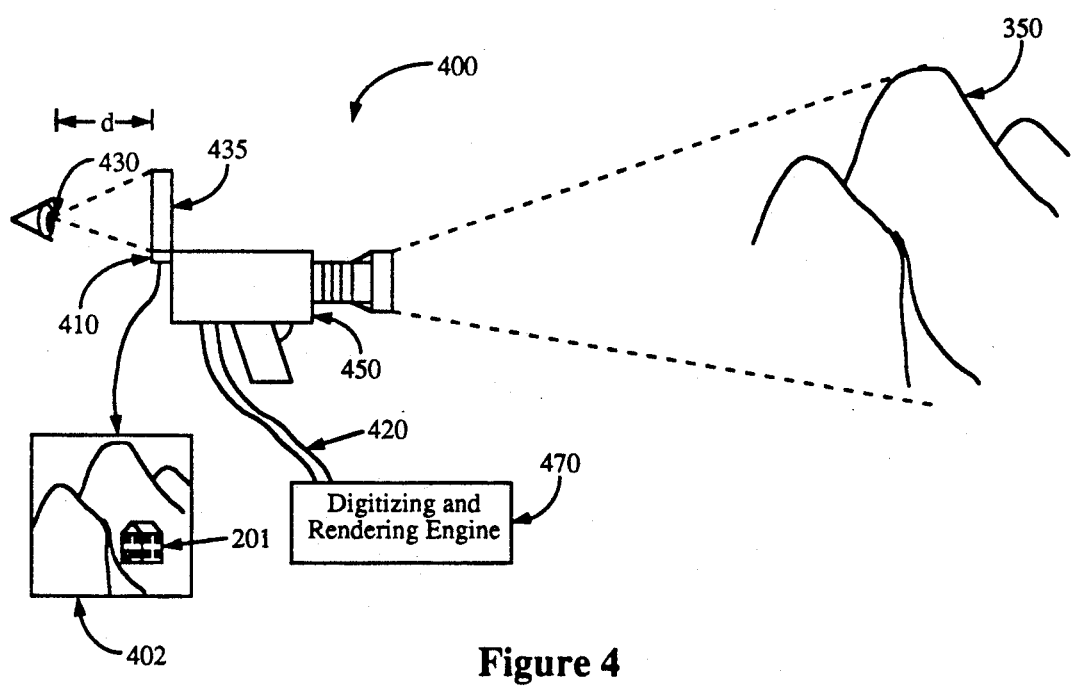
FIG. 4 shows an alternative embodiment wherein a camera may be used for sampling a scene image and the computer-generated 3-D rendering may be superimposed on that sampled image.

As is shown in FIG. 4, an apparatus such as 400 may be used in the place of that shown in FIG. 3. 400 generally comprises a video camera such as 450 which may be one of many video cameras commercially available. Video camera 450 may be coupled to a digitizing and rendering engine 470 via a cable and interface such as 420 shown in FIG. 4. For instance, 470 like 370, may be a workstation or other computer system which is commercially available. However, digitizing and rendering engine 470 further has the capability to receive video data over a line such as 420, and is capable of digitizing the video data received. Then, the digitized video data may be rendered onto a display such as 435. This shows the image 402 of a background scene 350 shown in FIG. 4. Once the image has been digitized, a second rendered image, such as the image 201 of a structure previously described, may be superimposed upon a scene such as 402 shown in FIG. 4. Again, the scale and perspective of the image 201 may be varied depending on the distance d from the viewfinder 435 position to a viewer or center of projection position 430 as is shown in FIG. 4. The device 400 shown in FIG. 4 will have a range finding device such as 410 shown in FIG. 4 which will also provide the capability to ascertain the distance d. In this manner, the perspective of the background scenery 350 from a user's position such as 430 may be maintained.

In yet in another alternative embodiment, the apparatus of FIG. 4 may be used for "genlocking" or synchronizing the video signal from a video camera such as 450 with imagery rendered by an engine such as 470 shown in FIG. 4. Therefore, live video imagery 402 may be used instead a digitized image generated by camera 450, and the computer-generated image 201 may be superimposed. In this manner, once the distance d is determined by rangefinder 410 coupled to display 435, the proper perspective for image 201 may be determined for superimposing upon the background video imagery such as 402.

In the foregoing specification, the present invention has been described with reference to specific embodiments thereof. It will, however, be evident that various modifications and changes may be made thereto without departing from the broader spirit and scope of the present invention as set forth in the appended claims. The specification and drawings are, accordingly, to be regarded in an illustrative rather than a restrictive sense.

What is claimed is:

1. An apparatus for displaying images comprising:
   a. a display for displaying rendered imagery said display being substantially transparent to a viewer of the display;
   b. an automatic rangefinder coupled to the display for determining the distance from a viewer to the display, said distance which may vary between a minimum distance and a maximum distance; and c. a means for displaying an image upon the display, the image having a perspective such that the display is a projection plane of a perspective volume, and a distance from the projection plane to a center of the projection is proportional to the distance from the display to the viewer, the distance from the center of the projection to the projection plane being dynamically modifiable depending on the distance detected by the rangefinder.

2. The apparatus of claim 1 wherein the rangefinder comprises a sonar rangefinding device.

3. The apparatus of claim 1 wherein the rangefinder comprises an infrared rangefinding device.

4. The apparatus of claim 1 wherein the display may be held in a field of view of the viewer of a background scene, the image appearing superimposed upon the background scene by a viewer of the display.

5. The apparatus of claim 1 wherein the display is a liquid crystal display (LCD).

6. The apparatus of claim 1 further comprising a second rangefinder for determining a distance from the display to a background scene, said means for displaying said image on said display further comprising a means for dynamically adjusting said perspective of said image by modifying the distance from said projection plane to a background scene of said perspective volume proportional to said distance from said display to said background scene determined by said second rangefinder.

7. An apparatus for displaying images comprising:
a. a display for displaying rendered imagery;
b. an automatic rangefinder coupled to the display, the rangefinder for determining the distance from a viewer to the display, said distance which may vary between a minimum distance and a maximum distance; and c. a means for displaying an image upon the display, the image having a perspective such that the display is a projection plane of a perspective volume, and a distance from the projection plane to a center of the projection is proportional to the distance from the display to the viewer, the distance from the center of the projection to the projection plane being dynamically modifiable depending on the distance detected by the rangefinder.

8. The apparatus of claim 7 wherein the rangefinder comprises a sonar rangefinding means.

9. The apparatus of claim 7 wherein the rangefinder comprises an infrared rangefinding means.

10. The apparatus of claim 7 wherein the display is substantially transparent and the display may be suspended against a background scene, the image appearing superimposed upon the background scene by a viewer of the display.

11. The apparatus of claim 7 further comprising a means for superimposing the image onto a background image.

12. The apparatus of claim 11 wherein the background image is a live video image.

13. The apparatus of claim 12 wherein the means for superimposing comprises a video signal synchronizing (genlock) means.

14. The apparatus of claim 11 wherein the background image is a digitized video image.

15. The apparatus of claim 6 further comprising a second rangefinder for determining a distance from the display to a background scene, said means for displaying said image on said display further comprising a means for dynamically adjusting said perspective of said image by modifying the distance from said projection plane to a background scene of said perspective volume proportional to said distance from said display to said background scene determined by said second rangefinder.

* * * * *